US008438653B2

(12) United States Patent
Dutta et al.

(10) Patent No.: US 8,438,653 B2
(45) Date of Patent: May 7, 2013

(54) STRATEGIES FOR CONTROLLING USE OF A RESOURCE THAT IS SHARED BETWEEN TRUSTED AND UNTRUSTED ENVIRONMENTS

(75) Inventors: Sunava Dutta, Seattle, WA (US); Zhenbin Xu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1234 days.

(21) Appl. No.: 11/733,317

(22) Filed: Apr. 10, 2007

(65) Prior Publication Data

US 2008/0256601 A1    Oct. 16, 2008

(51) Int. Cl.
    *H04L 29/06* (2006.01)
(52) U.S. Cl.
    USPC .................................. 726/27; 726/25; 726/26
(58) Field of Classification Search .............. 726/25, 726/26, 27
    See application file for complete search history.

(56) References Cited

U.S. PATENT DOCUMENTS

| | | | |
|---|---|---|---|
| 5,392,386 A | 2/1995 | Chalas | |
| 6,269,389 B1 * | 7/2001 | Ashe | 718/100 |
| 6,321,256 B1 * | 11/2001 | Himmel et al. | 709/218 |
| 6,345,318 B1 * | 2/2002 | Gamon | 710/8 |
| 6,725,380 B1 * | 4/2004 | Forlenza et al. | 726/6 |
| 6,874,084 B1 | 3/2005 | Dobner et al. | |
| 6,950,980 B1 | 9/2005 | Malcolm | |
| 6,951,295 B1 | 10/2005 | Gaus et al. | |
| 6,983,328 B2 | 1/2006 | Beged-Dov et al. | |
| 6,986,105 B2 | 1/2006 | Walker, Jr. | |
| 7,146,571 B2 | 12/2006 | Bates et al. | |
| 7,260,636 B2 * | 8/2007 | Blumenau et al. | 709/227 |
| 7,389,511 B1 * | 6/2008 | Maynard | 719/310 |
| 7,483,896 B2 * | 1/2009 | Johnson | 1/1 |
| 7,484,245 B1 * | 1/2009 | Friedman et al. | 726/27 |
| 7,509,397 B1 * | 3/2009 | Totty et al. | 709/219 |
| 2002/0124172 A1 | 9/2002 | Manahan | |
| 2002/0138653 A1 | 9/2002 | Ogura | |
| 2002/0181448 A1 * | 12/2002 | Uskela et al. | 370/352 |
| 2002/0184491 A1 | 12/2002 | Morgan et al. | |

(Continued)

OTHER PUBLICATIONS

Adler, et al., "TellTable: A Server for Collaborative Office Applications," accessible at <<http://www.csi.uottawa.ca/~adler/publications/2004/adler-nash-noel-2004-cscw-telltable.pdf>>, Proceedings of CSCW 2004, Chicago, Nov. 6-10, 2004, 6 pages.

(Continued)

*Primary Examiner* — Carl Colin
*Assistant Examiner* — Chau Le
(74) *Attorney, Agent, or Firm* — Wolfe-SBMC

(57) ABSTRACT

A strategy is described for controlling access to a resource which is shared between a trusted environment and an untrusted environment. The resource can represent a clipboard module. The trusted environment can include trusted client functionality, while the untrusted environment can include potentially untrusted network-accessible entities (e.g., websites) which seek to access the clipboard module. The strategy provides a security presentation which notifies a user when a network-accessible entity is attempting to access the clipboard module, identifying the entity which is making the attempt, together with the nature of the information being read or added to the clipboard module. The security presentation invites the user to approve or deny the particular attempt (or all such attempts from the network-accessible entity), and/or clear the clipboard module. The security presentation does not block the user's interaction with other parts of a user interface presentation.

18 Claims, 7 Drawing Sheets

U.S. PATENT DOCUMENTS

| | | | |
|---|---|---|---|
| 2003/0028762 A1 | 2/2003 | Trilli et al. | |
| 2004/0010701 A1* | 1/2004 | Umebayashi et al. | 713/193 |
| 2004/0034794 A1* | 2/2004 | Mayer et al. | 713/200 |
| 2004/0100496 A1* | 5/2004 | Creasor et al. | 345/748 |
| 2004/0193597 A1 | 9/2004 | Johnson | |
| 2004/0226012 A1 | 11/2004 | Awada et al. | |
| 2004/0260793 A1* | 12/2004 | Ichikawa et al. | 709/219 |
| 2005/0182928 A1* | 8/2005 | Kamalanathan et al. | 713/164 |
| 2005/0268100 A1 | 12/2005 | Gasparini et al. | |
| 2006/0053293 A1 | 3/2006 | Zager et al. | |
| 2006/0218403 A1 | 9/2006 | Sauve et al. | |
| 2006/0225137 A1 | 10/2006 | Odins-Lucas et al. | |
| 2006/0277341 A1* | 12/2006 | Johnson | 710/200 |
| 2007/0011749 A1* | 1/2007 | Allison et al. | 726/26 |
| 2007/0055478 A1* | 3/2007 | Perazzolo | 702/182 |
| 2007/0107057 A1* | 5/2007 | Chander et al. | 726/22 |
| 2007/0277120 A1* | 11/2007 | Wilson et al. | 715/808 |
| 2008/0022043 A1* | 1/2008 | Adams et al. | 711/115 |

OTHER PUBLICATIONS

Fenstermacher, et al., "A Lightweight Framework for Cross-Application User Monitoring," accessible at <<http://ieeexplore.ieee.org/iel5/2/21332/00989930.pdf>, Computer, vol. 35, Issue 3, Mar. 2002, pp. 51-59.

Ross, et al., "Stronger Password Authentication Using Browser Extensions," accessible at <<http://www.usenix.org/publications/library/proceedings/sec05/techlfull_papers/ross/ross.pdf>>, 14th USENIX Security Symposium, Baltimore, Jul. 31-Aug. 5, 2005, pp. 17-31.

Verisign Inc., "Licensing verisign certificates: securing multiple web server and domain configurations", www.msctrustgate.com/pdf/licensing.pdf, white paper,(2001).

Herzberg, Amir et al., "Protecting valve web users, or preventing spoofing and establishing credential sites", www.cs.bu.ac.il/~herzea/papers/ecommerce/trusted credentials area.pdf, Bar Ilan University,(Jul. 2004).

NCIPHER Inc., "Protecting commercial secure web servers from key-finding treats", www.ncipher.com/uploads/resources/pcws.pdf, white paper, (1999).

* cited by examiner

STRATEGIES FOR CONTROLLING USE OF A RESOURCE THAT IS SHARED BETWEEN TRUSTED AND UNTRUSTED ENVIRONMENTS

BACKGROUND

A clipboard facilitates the transfer of information between applications. For example, in one traditional scenario, a user can copy information from a first application to the clipboard, open up a second application, and then paste the contents of the clipboard into the second application.

At least one browser provides a clipboard for use in a wide area network environment, such as the Internet. This allows, for example, a user to copy information from an application to the clipboard, open a web page using the browser, and then paste the contents of the clipboard into an input field of the web page. A website may also independently read information from the clipboard or write information to the clipboard, or perform some other action that affects the clipboard.

Most websites use the clipboard for legitimate purposes. However, there is also a risk that a website may intentionally or unintentionally access the clipboard for purposes which are contrary to the interests of the end user. Consider two examples. In a first case, the user may have copied sensitive information into the clipboard. For example, the user may have copied a bank account number into the clipboard so that she may later paste this information into an input field of a banking-related website. However, in one scenario, the user may inadvertently be directed to a website that is masquerading as the legitimate banking-related website. That malicious website can extract the sensitive information from the clipboard and potentially use that information to access the user's banking account.

In a second case, a malicious website may add information to the clipboard that includes potentially harmful content. For example, the website may add information to the clipboard that includes code-bearing content or other executable or interpretable information. If the user pastes the code-bearing content into an application, the content can potentially cause the application to fail. The code-bearing content can also potentially cause more pervasive damage to the user's system.

In general, an Internet-accessible clipboard is a resource that is shared between a trusted environment and a potentially untrusted environment. The trusted environment may include one or more trusted applications, such as one or more applications that run locally on the user's client device. The untrusted environment may include one or more potentially untrusted websites or other network-accessible entities.

Phrased in these terms, it would be desirable to effectively control access to a clipboard (or other type of resource) that is shared between a trusted environment and an untrused environment.

SUMMARY

A strategy is described for controlling access to a resource which is shared between a trusted environment and an untrusted environment. The resource can represent a memory module, such as a clipboard module, that can be accessed by various entities. The trusted environment can include trusted client functionality, while the untrusted environment can include potentially untrusted network-accessible entities (e.g., web pages). The network-accessible entities may seek to read information from the clipboard module or write information to the clipboard module or perform some other action which affects the clipboard module. Some of the network-accessible entities may seek access to the clipboard module for purposes that are undesirable from the standpoint of the end user.

The strategy provides a security presentation which helps the user decide whether a network-accessible entity should be allowed to access the clipboard module. The security presentation notifies a user when a network-accessible entity is attempting to access the clipboard module, identifying the entity which is making the attempt, together with the nature of the information being read or added to the clipboard module. The security presentation invites the user to approve or deny the current attempt (or approve or deny all such attempts from the network-accessible entity), and/or clear the clipboard module. The security presentation does not block the user's interaction with other parts of a user interface presentation.

Additional exemplary implementations and features are described in the following.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for controlling access to a resource that is shared between a trusted environment and an untrusted environment. The strategy can be manifested in various systems, apparatuses, modules, procedures, storage mediums, data structures, and other forms.

This disclosure includes the following sections. Section A describes an exemplary system for controlling access to a resource, such as a clipboard module. Section B describes an exemplary procedure that explains the operation of the system of Section A.

A. Exemplary System

As a preliminary note, any of the functions described with reference to the figures can be implemented using software, firmware, hardware (e.g., fixed logic circuitry), manual processing, or a combination of these implementations. The term "logic, "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

A.1. Overview of System (FIG. 1)

Figure 1:
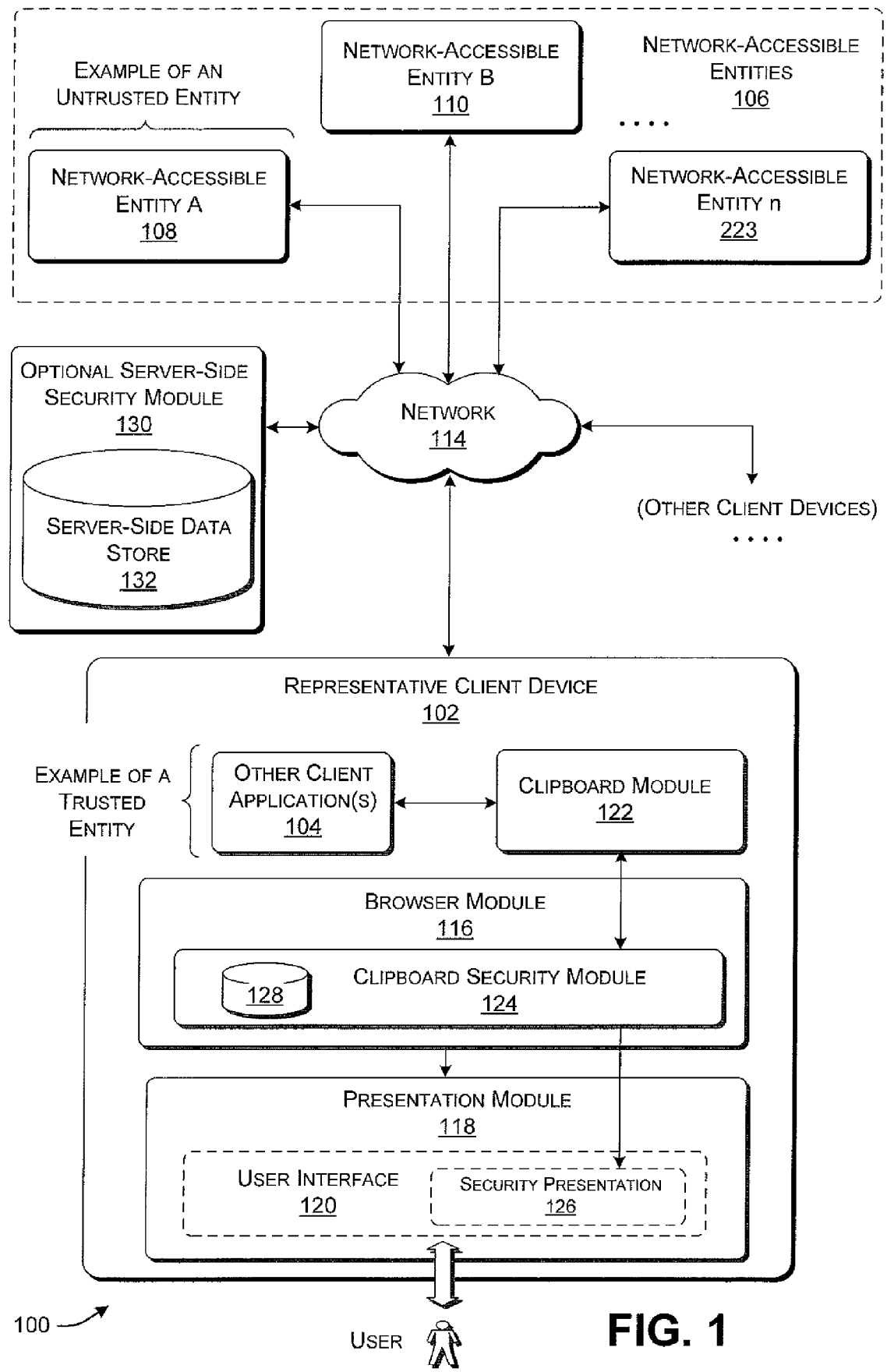
FIG. 1 shows an exemplary system for controlling access to a clipboard module by providing a security presentation.

FIG. 1 shows one exemplary system 100 for controlling access to a shared resource. The resource may be shared between a trusted environment and an untrusted environment. The trusted environment may include functionality associated with a representative user device 102, such as one or more client applications 104. The untrusted environment may include a plurality of network-accessible entities 106, including representative network-accessible entity A 108, network-accessible entity B 110, and network-accessible entity n 112. Generally stated, the trusted environment is trusted in the sense that an end user has reasonable assurance the agents within the environment will operate in conformance with the interests of the end user. The untrusted environment is untrusted in the sense that the end user has no reasonable assurance that agents will operate in conformance with the interests of the end user.

In accordance with one implementation of the system 100, the user device 102 can comprise any processing device that can be operated by the user. For example, the user device 102 can represent a personal computer, a lap-top computer, a personal digital assistant (PDA), a mobile telephone, a game console, a set-top box, and so forth. The network-accessible entities 106 can comprise various websites associated with respective network addresses. Each network-accessible entity 106 can represent one or more server-type computers, data stores, and/or other processing equipment. A network 114 can couple the user device 102 to the network-accessible entities 106. The network 114 can represent a wide area network (WAN) (such as the Internet), a local area network (LAN) (such as an intranet), or some combination of WAN(s) and LAN(s). The network 114 can include any combination of hardwired and/or wireless links, routers, gateways, name servers, etc., governed by any protocol or combination of protocols.

The representative user device 102 can interact with the network-accessible entities 106 using a browser module 116. The browser module 116 represents functionality (e.g., software and/or hardware) for allowing users to access the network-accessible entities 106, receive content provided by these network-accessible entities 106, and then interact with this received content. More specifically, the browser module 116 allows users to access various websites, display various web pages provided by these websites, and then interact with these web pages.

The browser module 116 can present information to the user via a presentation module 118. The presentation module 118 represents any type of display device, audio output device, etc., and/or any combination of such devices. The presentation module 118 presents its output in the form of a user interface presentation 120, such as a graphical user interface presentation (GUI).

The shared resource can represent any functionality that is shared between the trusted environment and the untrusted environment. For example, the shared resource can represent a memory module that can be accessed by both the trusted environment and the untrusted environment, such as a clipboard module 122. Users may copy information to the clipboard module 122 and read information from the clipboard module 122. For example, the user can add information to the clipboard module 122 from one application, open a second application, and then paste the information from the clipboard module 122 into the second application. In the context of FIG. 1, any agent in the trusted environment and any agent in the untrusted environment can read from and/or write to the clipboard module 122. For example, one of the local client applications 104 can access the clipboard module 122. Further, one or more of the network-accessible entities 106 can access the clipboard module 122.

The following explanation will describe security provisions for controlling access to the clipboard module 122. However, it should be noted that the principles described herein are applicable to other types of shared resources. Moreover, FIG. 1 illustrates the clipboard module 122 as being locally implemented by the user device 102. But in another case, a remote entity (such as a server-type computer) can be used to implement the clipboard module 122. In still another implementation, the clipboard module 122 can be implemented by a combination of local and remote functionality.

The browser module 116 includes a clipboard security module 124. The purpose of the clipboard security module 124 is to control access to the clipboard module 122 by one of the network-accessible entities 106. That is, the clipboard security module 124 controls whether a network-accessible entity (e.g., a website) is allowed to read information from the clipboard module 122 and/or write information to the clipboard module 122 and/or perform any other action that affects the clipboard module 122.

The clipboard security module 124 performs the above-described role by providing a security presentation 126 on the user interface presentation 120. Assume, for instance, that the browser module 116 is interacting with a web page provided by one of the network-accessible entities 106. This web page, as presented to the users constitutes an instance of "main content," according to the terminology used herein. The browser module 116 can present the main content in a first user interface presentation. The clipboard security module 124 can present the security presentation 126 in a second user interface presentation. In one exemplary implementation, the second user interface presentation can comprise a panel or other kind of display section that is displayed adjacent to the first user interface presentation, e.g., as a "sidebar" with respect to the first user interface presentation.

In one implementation, the clipboard security module 124 presents the security presentation 126 when it detects that a network-accessible entity is attempting to access the clipboard module 122, e.g., to read information from the clipboard module 122 or write information to the clipboard module 122 or perform any other action that affects the clipboard module 122. The clipboard security module 124 can remove the security presentation 126 after the threat posed by the access attempt has been resolved (in any one of the ways to be described below).

The clipboard security module 124 presents various fields of information via the security presentation 126. By way of overview, the clipboard security module 124 can convey, without limitation, one or more of the following fields of information. Later sections provide a more detailed explanation of the information that can be conveyed by the security presentation 126.

Access Notification Field. The clipboard presentation module 124 can display a message which alerts the user that there has been an attempt to access the clipboard module 122. This message can identify the network-accessible entity which is making the attempt as well as what action the entity is attempting to perform.

Warning Message Field. The clipboard presentation module 124 can optionally display a warning message to the user which characterizes the type of the threat posed by the access attempt.

Clipboard Contents Field. The clipboard presentation module 124 can provide a message which conveys the nature of the information that the network-accessible entity is attempting to read from the clipboard module 122 or write to the clipboard module 122.

Action Invitation Field. The clipboard presentation module 124 can display various command prompts which invite the user to take action with respect to the attempted access. One such command prompt invites the user to approve the current access attempt. Another command prompt invites the user to deny the current access attempt. Another command prompt invites the user to approve all access attempts by the particular network-accessible entity that is making the current access attempt, including the current attempt and all future attempts. Another command prompt invites the user to deny all access attempts by the particular network-accessible entity, including the current attempt and all future attempts. Another command prompt invites the user to clear the information stored in the clipboard module 122 or only selected parts of the information. Still further command prompts can be provided to the user. The user can select any one or more of these command prompts to take action with respect to the attempted access.

In another case, one or more aspects of the security presentation 126 can be conveyed to the user in audible form or some other form, rather than, or in addition to, visual form.

The clipboard security module 124 can provide the security presentation 126 in such a manner that this presentation is non-blocking with respect to the main content being provided in the first user interface presentation. This means that the browser module 116 allows the user to continue interacting with the main content while the clipboard security module 124 is waiting for the user to make a decision with respect to the attempted access (e.g., whether to approve or deny the attempt), if, in fact, a particular access attempt requires the user to make a decision. This is in contrast with a type of display that freezes interaction with the main content until the user makes a decision regarding how to proceed.

In one implementation, the clipboard security module 124 represents functionality that is implemented by the user device 102. In performing its role, the local clipboard security module 124 can make access to one or more stores, represented by local store 128. For example, the local store 128 can maintain a list of network-accessible entities that the user has generally permitted to access the clipboard module 122 (e.g., by activating an "Approve Always" command prompt for these entities), and/or a list of network-accessible entities that the user has generally prohibited from accessing the clipboard module 122 (e.g., by activating a "Deny Always" command prompt for these entities).

In another implementation, remote network-accessible security functionality can alternatively, and/or in addition, help control access to the clipboard module 122. Optional server-side security module 130 can implement such network-accessible security functionality. The server-side security module 130 includes one or more data stores, represented by server-side data store 132. In one case, the server-side security module 130 can maintain, on behalf of the user device 102, the above-described list(s) of approved and prohibited network-accessible entities. The server-side security module 130 can maintain such lists for other user devices too. Alternatively, and/or in addition, the server-side security module 130 can provide a community-based repository for sharing information among a group of users regarding the behavior of network-accessible entities. Through this mechanism, users can access and rely on approval/denial decisions made by other users and/or general warnings issued by other users.

The following sections provide additional details regarding the features introduced above.

A.2. Exemplary Security-Related Functionality (FIG. 2)

Figure 2:
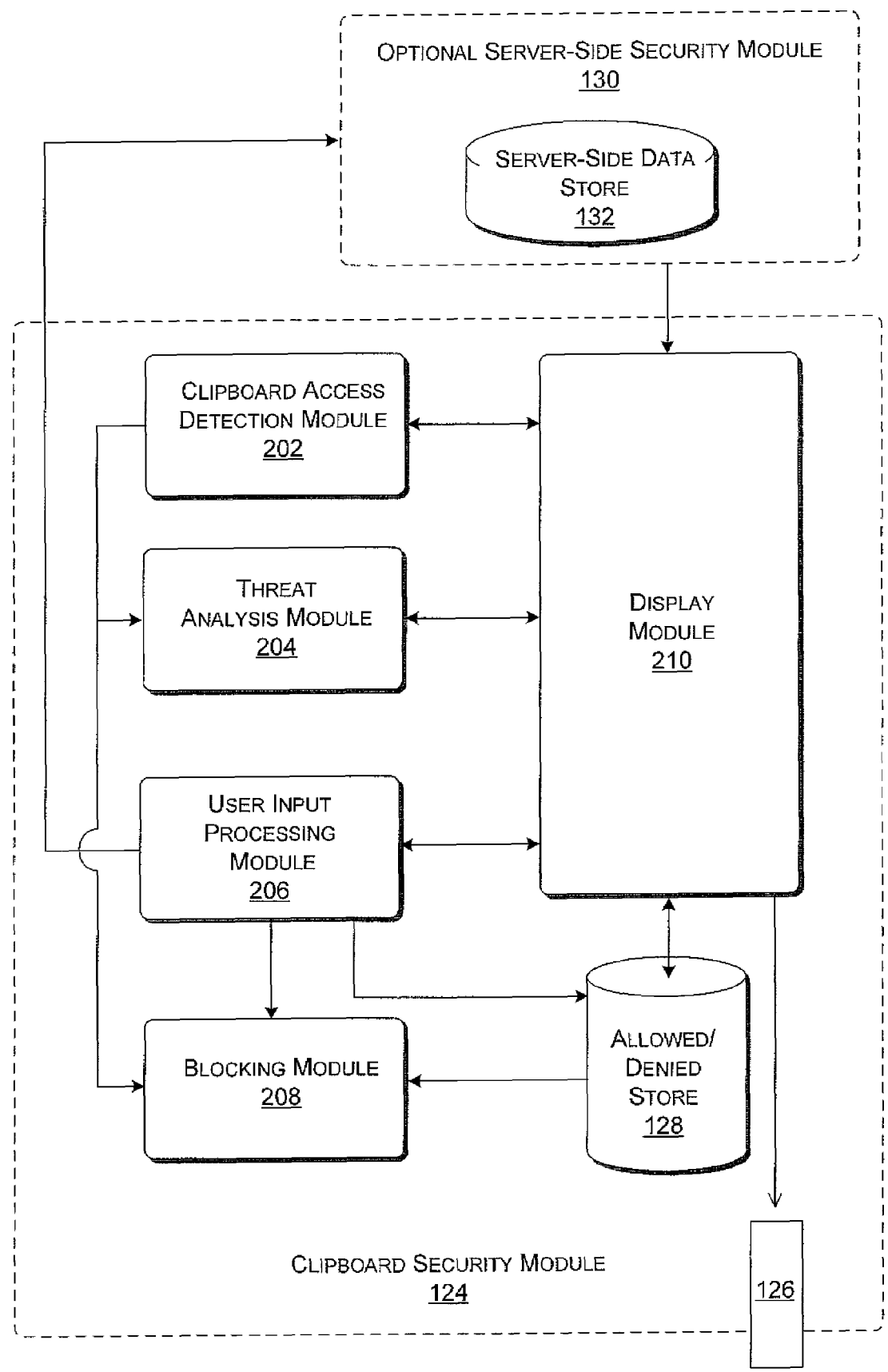
FIG. 2 shows exemplary security functionality for controlling access to the clipboard module for use in the system of FIG. 1.

FIG. 2 shows one exemplary implementation of various components of FIG. 1 that are dedicated to controlling access to the clipboard module. These components include the client-side clipboard security module 124 and the server-side security module 130. While FIG. 2 shows a particular exemplary allocation of modules between the clipboard security module 124 and the server-side security module 130, other implementations can allocate these modules in a different way, e.g., by moving certain modules to the server-side security module 130 from the clipboard security module 124 and/or vice versa.

The clipboard security module 124 includes various component modules. An access detection module 202 detects whether a network-accessible entity is attempting to read information from the clipboard module 122 and/or write information to the clipboard module 122 and/or perform any other action which affects the clipboard module 122. In one case, the access detection module 202 can detect any kind of access. In another case, the access detection module 202 can flag only certain types of access. For instance, in one case, the access detection module 202 can detect when a network-accessible entity is using a script-based program or other type of program to automatically access the clipboard module 122. In general, the access detection module 202 can determine whether an entity is attempting to access the clipboard module 122 based on a request or other instruction that is submitted to the clipboard module 122 by the entity.

The access detection module 202 can extract various information regarded a detected access. For instance, the access detection module 202 can extract an identifier assigned to the entity which is making the access attempt. The identifier may correspond to the network address of the entity that is making the access attempt. The access detection module 202 can also optionally determine the type of request being submitted to the clipboard module 122. In one case, the entity can be attempting to read information from the clipboard module 122. In another case, the entity can be attempting to write information to the clipboard module 122. In another case, the entity can be attempt to exert control over the behavior of the clipboard module 122, such as by attempting to periodically flush the contents of the clipboard module 122.

The clipboard security module 124 can optionally also include a threat analysis module 204. The threat analysis module 204 can characterize the type of threat posed by the access attempt and present a warning message to the user based on its analysis. In one case, the threat analysis module 204 can rely on a set of stored rules which map various types of situations that may be encountered with the types of threats posed by the respective situations. For example, the threat analysis module 204 can determine that an entity poses a threat if it has made a rapid series of requests to read or write information from/to the clipboard module 122. In another case, the threat analysis module 204 can determine that an entity poses a threat if is attempting to write certain types of information to the clipboard module 122. For example, the threat analysis module 204 can identify content that contains machine-readable instructions or other machine-interpretable information as being potentially dangerous. In another case, the threat analysis module 204 can determine that an entity poses a threat if it is attempting to read certain types of sensitive information from the clipboard module 122. For example, the threat analysis module 204 can identify content that appears to contain credit card account information as being potentially sensitive in nature. The threat analysis module 204 can apply yet other rules and provide corresponding warning messages based on the application of these rules.

The clipboard security module 124 can include a user input processing module 206. The purpose of the input processing module 206 is to receive input from the user regarding how to resolve a particular access attempt by a network-accessible entity. For example, the user may use the input processing module 206 to approve or deny a current access attempt, to approve or deny all access attempts by the particular entity making the current request, to clear all or part of the information stored in the clipboard module 122, and so forth.

The clipboard security module 124 can include a local store 128 for storing lists of approved and denied network-accessible entities (which have been identified by the user via the input processing module 206). That is, when the user activates a command prompt for "Approve Always," the user input processing module 206 can add the particular entity in question (which is making the current request) to a list of approved entities. When one of these approved entities again attempts to access the clipboard module 122, this entity will be automatically permitted to do so without troubling the user to expressly approve the access attempt. Nevertheless, the clipboard security module 124 can still optionally present a security presentation 126 to the user when a previously allowed entity is making an access attempt, e.g., to alert the user to the fact that such activity is taking place, and to give the user the option of changing the status of the entity from approved to denied. In contrast, when the user activates a command prompt for "Deny Always," the user input processing module 206 can add the particular entity in question (which is making the current request) to a list of denied entities. When one of these denied entities again attempts to access the clipboard module 122, this entity will be automatically blocked from doing so. Optionally, in this circumstance, the clipboard security module 124 can still display the security presentation 126 to alert the user to an access attempt that is taking place.

A blocking module 208 can accept a user's current or previous approve/deny instructions to either approve or deny access to the clipboard module 122. The blocking module 210 can deny access to the clipboard module 122 by rejecting a request to access the clipboard module 122 and/or by taking some other blocking action(s).

As explained above in section A.1, the server-side security module 130 can also play a role in governing access to the clipboard module 122. In one case, the server-side security module 130 can store the approved/denied lists for the user device 102 (and for many other user devices, not shown), instead of, or in addition to, relying on the user device 102 to store this information. In another case, the server-side security module 130 can allow a user to share his or her approved/denied lists with another user or a group of other users. A user who receives such lists can then rely on these lists to govern access to his or her own clipboard module (not shown). In another case, the server-side security module 130 can supplement or replace the threat analysis that is optionally locally performed by the threat analysis module 204. In another case, the server-side security module 130 can aggregate the approved/denied lists of many users to provide a community-based master list of approved and denied entities. For instance, such a community-based master list could identify entities that have been identified by a significant number of users as posing a serious security threat. The server-side security module 130 can be used in yet other ways.

Finally, the clipboard security module 124 can include a display module 210. The purpose of the display module 210 is to interact with one or more of the above-described modules to generate the security presentation 126. The following section describes the exemplary operation of the display module 210 in greater detail.

Figure 4:
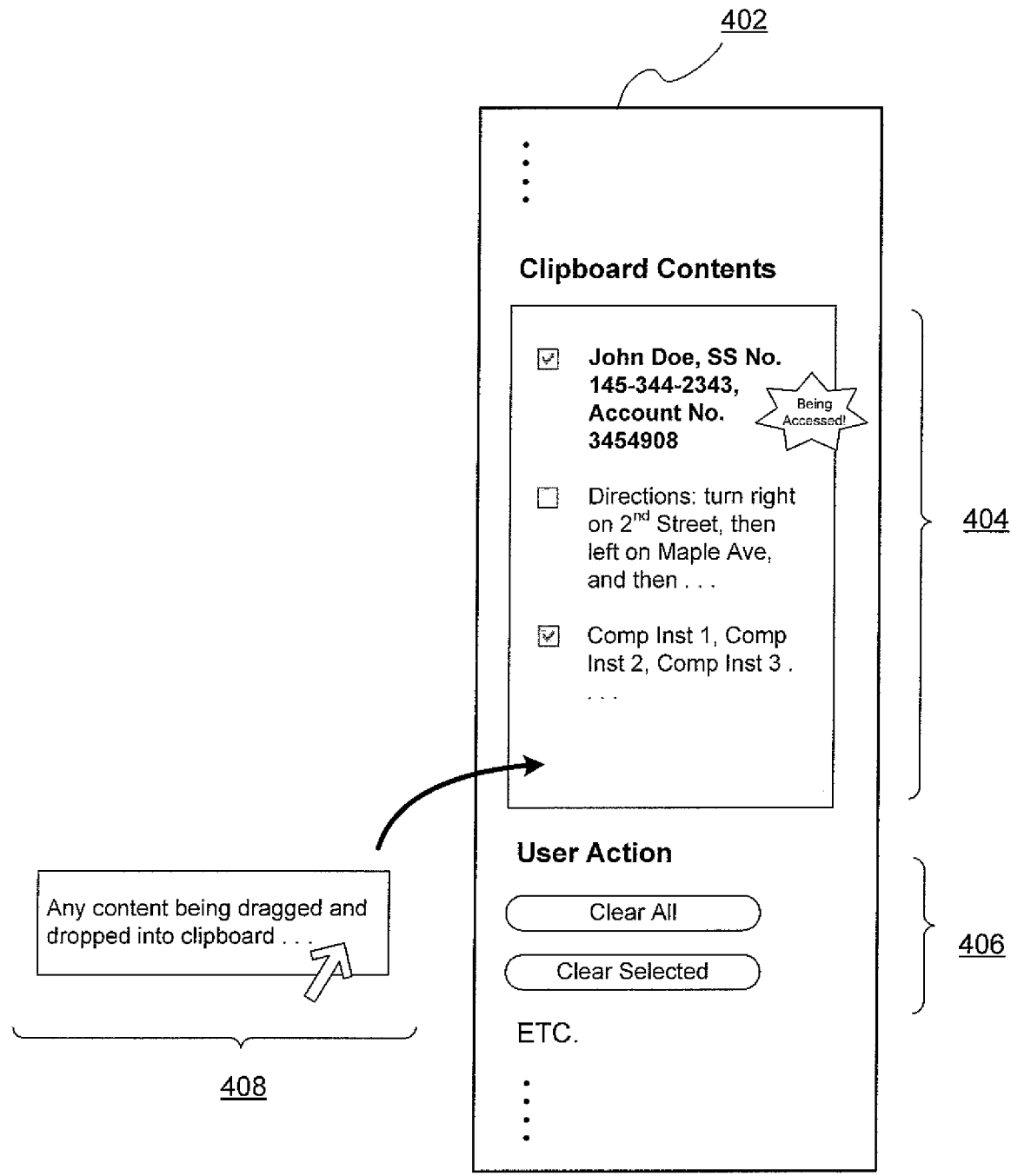
FIG. 4 shows another exemplary implementation of the security presentation.
Figure 5:
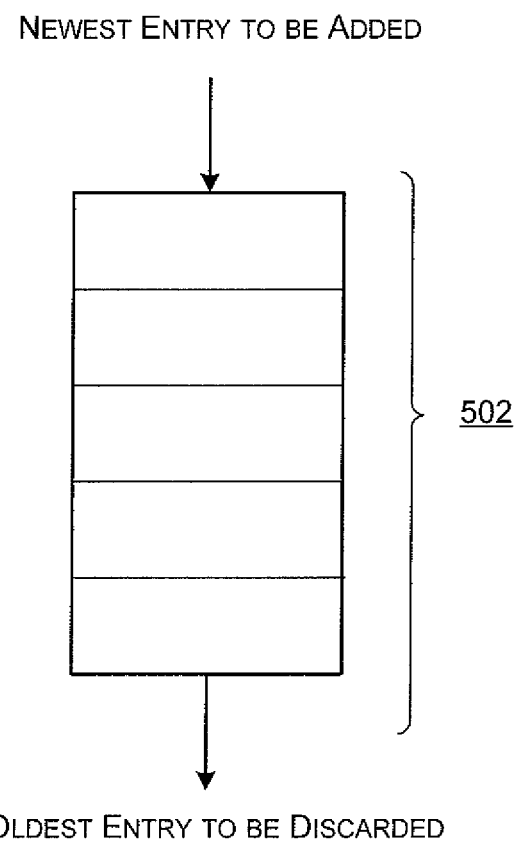
FIG. 5 illustrates an exemplary manner in which the clipboard module can retain and remove entries.

A.3. Exemplary Security Presentations (FIGS. 3-5)

Figure 3:
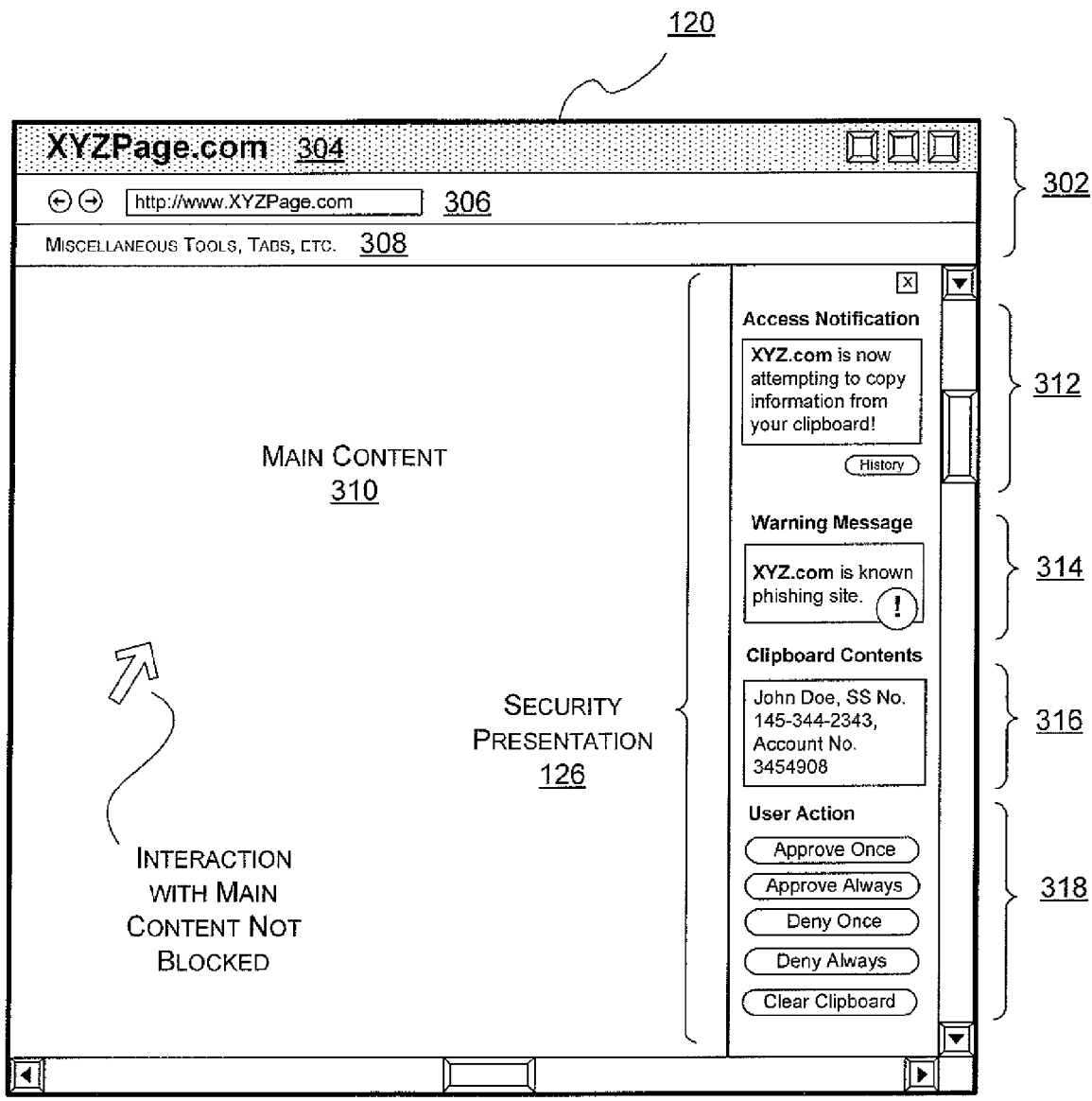
FIG. 3 shows an exemplary user interface presentation that includes one exemplary implementation of the security presentation.

FIG. 3 shows a user interface presentation 120 that can be generated by the browser module 116. This user interface presentation 120 is representative and non-limiting. Other user interface presentations can adopt a different style, selection of parts, arrangement of parts, and so forth, compared to that shown in FIG. 3.

The user interface presentation 120 includes various parts. A header part 302 provides various conventional fields of information presented by many types of browser modules, such as a title bar field 304, a page address field 306, and a field 308 that provides an assortment of tools, tabs, and so forth. (More generally, tools, tabs, etc. can be distributed throughout the header part 302 in various ways, e.g., in various bars, not specifically shown.)

The page address field 306 can identify a network address of a page with which the user is currently interacting. A main content part 310 shows the contents of the page corresponding to the identified network address. The main content part 310 can include any combination of text, images, animated content, user controls, and so on.

The user interface presentation 120 also includes the security presentation 126. In this particular case, the clipboard security module 124 (more particularly, the display module 210) displays the security presentation 126 as a sidebar to the right of the main content part 310. This is one of many possible implementations. In other cases, the clipboard security module 124 can display the security presentation 126 to the left, top, and/or bottom with respect to the main content part 310, or at some point within the main content part 310. In another case, the clipboard security module 124 can display the security presentation 126 as a semi-transparent presentation on top of the main content part 310; this allows the user to see information being imparted by both the security presentation 126 and the underlying main content part 310. In another case, the clipboard security module 124 can display the security presentation 126 on one presentation module and the main content on another, distinct, presentation module. Still other implementations are possible.

In one case, the clipboard security module 124 can present the security presentation 126 when an access attempt is detected. The clipboard security module 124 can then remove the security presentation 126 when the access attempt has been approved or denied. In one case, the clipboard security module 124 can automatically display the security presentation 126 when the attempt is detected, e.g., without querying the user whether the user wants such a display. In another case, the clipboard security module 124 can expressly prompt the user whether they want the security presentation 126 to be displayed. In another case, the clipboard security module 124 can allow the user to activate the security presentation 126 at any time, e.g., even though there is no access attempt currently being made.

In one case, the clipboard security module 124 can remove the security presentation 126 when the user enters a command via the security presentation 126. For example, the clipboard security module 124 can remove the security presentation 126 when the user enters any kind of approve/deny instruction and/or any kind of clipboard flushing instruction. Or the clipboard security module 124 can remove the security presentation 126 when the user enters an express command to remove this presentation, even though the user may not have made a decision regarding whether to approve or deny an attempted access.

In another case, the clipboard security module 124 can automatically remove the security presentation 126 after a predetermined time, such as, without limitation, 30 seconds. In one implementation, the clipboard security module 124 can remove the presentation by fading it out, that is, by gradually making it more transparent with respect to the underlying main content part 310. The clipboard security module 124 may automatically remove the security presentation 126 in those cases in which the user does not need to make a decision with respect to an access attempt. For instance, the clipboard security module 124 can display the security presentation 126 to alert the user to the fact that an entity having the status of "deny always" has made an attempt to access the clipboard module 122. Since the clipboard security module 124 will automatically block this access attempt, the user need not input any express instructions with respect to the current access. In this scenario, the clipboard security module 124 can remove the security presentation after a predetermined period of time.

In another case, an access attempt may not be approved or denied in advance. Even in this case, the clipboard security module 124 can automatically remove the security presentation 126 after a predetermined period of inaction by the user, that is, without receiving an approve/deny instruction from the user. The clipboard security module 124 can rely on various default rules to determine the status of the access attempt in such a case. In one case, the clipboard security module 124 can automatically deny an access attempt if the user does not make a decision. In another case, the clipboard security module 124 can automatically approve an access attempt if the user does not make a decision. The user may optionally be allowed to configure the clipboard security module 124 to apply a desired default rule in the event of user inaction.

In one case, the browser module 116 can clear the contents of the clipboard module 122 when the browser is closed.

As described above, the security presentation 126 can include various fields. FIG. 3 shows an exemplary assortment of fields (312-318). The style of the fields, arrangement of the fields, selection of the fields, and so forth is representative; other implementations can adopt other configurations.

Access Notification Field. The security presentation 126 can display a message 312 which alerts the user that there has been an attempt to access the clipboard module 122. This message 312 can identify the network-accessible entity which is making the attempt. This message 312 can also identify the action that the entity is attempting to perform. The access detection module 202 of FIG. 2 can furnish the information that is used to populate this field.

In the example of FIG. 3, the message 312 indicates that a network-accessible entity identified as "XYZ.com" is attempting to read information from the clipboard module 122. The entity identified in message 312 may correspond to the same entity identified in the header 306 of the user interface presentation 120, meaning that the same entity that the user is interacting with in the main content part 310 is attempting to gain access to the clipboard module 122. But this is not necessarily the case. In the scenario shown in FIG. 3, the user is interacting with entity "XYZPage.com" in the main content part 310, yet the entity that is attempting to gain access to the clipboard module 122 is "XYZ.com." The entity making the access attempt ("XYZ.com") may represent a previously activated page which is still active. For instance, the XYZ.com entity may correspond to a page that the user has tagged, but the user currently does not have focus on this page.

Although not shown, the security presentation 126 (or some other presentation that can be activated by the user) can display any information regarding past attempts by one or more entities to access the clipboard module 122. This type of display can provide the user with additional context in deciding whether a current access attempt poses a threat or not. This display can take the form of a list of prior access attempts, with a series of columns identifying attributes of the attempts (such as entities making the attempts, the types of actions that the entities attempted to perform, the types of information targeted by the attempts, how the attempts were resolved, and so on). In the exemplary case of FIG. 3, the user may activate such a historical listing by actuating a "History" command prompt in message field 312.

Warning Message Field. The security presentation 126 can optionally display a warning message 314. The warning message can characterize the type of the threat posed by the access attempt. The threat analysis module 204 of FIG. 2 can furnish the information that is used to populate this field.

Clipboard Contents Field. The security presentation 126 can display a message 316 that conveys the nature of the information that the network-accessible entity is attempting to read from the clipboard module 122 or write to the clipboard module 122. The access detection module 202 of FIG. 2 can furnish the information that is used to populate the message 316. In the exemplary scenario shown in FIG. 3, the information stored in the clipboard module 122 corresponds to sensitive user information, such as the user's social security number and bank account number. This is an example of the type of information that the user typically would not want released to unauthorized parties.

Action Invitation Field. The security presentation 126 can display various command prompts in message field 318. These command prompts invite the user to take action with respect to the attempted access. One such command prompt invites the user to approve the current access attempt. Another command prompt invites the user to deny the current access attempt. Another command prompt invites the user to approve all access attempts by the particular network-accessible entity that is making the current access attempt. Another command prompt invites the user to deny all access attempts by the particular network-accessible entity making the current access attempt. Another command prompt invites the user to clear the information that is stored in the clipboard module 122. Still further command prompts can be provided to the user. The user can select any one or more of these command prompts to take action with respect to the attempted access.

As described above, the clipboard security module 124 can provide the security presentation 126 in such a manner that this presentation 126 is non-blocking with respect to the main content part 310. This means that the browser module 116 allows the user to continue to interact with the main content part 310 while the clipboard security module 124 is waiting for the user to make a decision (e.g., whether to approve or deny access), if, in fact, a particular instance of the security presentation 126 requires input from the user. This is in contrast to a type of display that freezes interaction with the main content part 310 until the user makes a decision regarding how to proceed.

In a variation of the above technique, the browser module 116 can provide multiple tabs. The browser module 116, under the direction of the user, can assign different network-accessible entities 106 (or different pages provided by a single network-accessible entity) to different tabs, and allow the user to interact with a particular entity or page by activating its associated tab. Activating a tab changes the focus of the user interface presentation 120. The clipboard module 122 can be shared among the various tabbed pages. In this scenario, assume that an entity attempts to access the clipboard module 122 while the user is interacting with a particular tabbed entity. The clipboard security module 124 can effectively freeze the user's interaction with the tabbed entity, yet allow the user to freely interact with other tabbed entities.

The clipboard module 122 can store information in different ways. In one case, the clipboard module 122 can store only the most recent entry added to the clipboard module 122. This scenario may correspond to the case of FIG. 3, in which the clipboard module 122 stores a single entry, as identified in message field 316. In this case, the user can operate the command prompts in field 318 to approve or deny access with respect to the single entry, and/or to clear the clipboard module with respect to the single entry.

In another case, the clipboard module 122 can store plural entries. Accordingly, the clipboard security module 124 can operate on the clipboard module 122 in a more selective manner. Consider the scenario shown in FIG. 4, which illustrates part of another security presentation 402. In this case, the clipboard module 122 stores at least three different entries. These entries may have been copied into the clipboard module 122 at different respective times. The security presentation 402 includes a message field 404 which itemizes the three entries in the clipboard module 122. The clipboard security module 124 can identify the entry (or plural entries) that are specifically being targeted by an access attempt, such as by highlighting the targeted entry or entries. In one case, an access attempt may be specifically directed to a particular entry, such as the most recently added entry. In other cases, the access attempt may include a general request to read from (or write to) the entire clipboard module 122.

As indicated in message field 406, the security presentation 402 can give the user the option of taking action with respect to only certain entries stored in the clipboard module 122. For example, the message field 404 includes illustrative checkboxes next to each entry that is stored in the clipboard module 122 (although other means of demarcating entries can be used). The user can check which entries will be affected by the command prompts provided in message field 406. In the exemplary case of FIG. 4, the message field 406 gives the user the option of clearing the entire contents of the clipboard module 122 or only clearing certain entries (which are checked). Although not shown, the message field 406 can also include command prompts which allow the user to make approve/deny decisions with respect to individual entries.

FIG. 4 also illustrates one exemplary way that a user may add a new entry to the clipboard module 122. In this technique, the user can drag and drop entry 408 into the message field 404 of the security presentation 402. For example, the user may be interacting with a web page or local application.

The user can move an entry from such a source into the clipboard module 122 using the drag and drop technique described above. Other techniques can be used to transfer entries into the clipboard module 122. Similar techniques can be used to selectively remove entries from the clipboard module 122 (such as by dragging and dropping an entry from the message field 404 into a trash bin UI field (not shown) of the user interface presentation.

FIG. 5 illustrates one way in which the clipboard module 122 can store and discard entries. As indicated there, the clipboard module 122 can accommodate a predetermined number of entries 502. The clipboard module 122 can fill this storage space on a first-in-first-out (FIFO) basis. Once full, the storage of a new entry in the clipboard module 122 will cause the removal of the oldest (i.e., least recently added) entry in the clipboard module 122. Other ways of managing the contents of the clipboard module 122 can be used. For example, the clipboard module 122 can automatically remove entries that have been stored in the clipboard module 122 for more than a prescribed period of time.

A.4. Exemplary Processing Functionality (FIG. 6)

Figure 6:
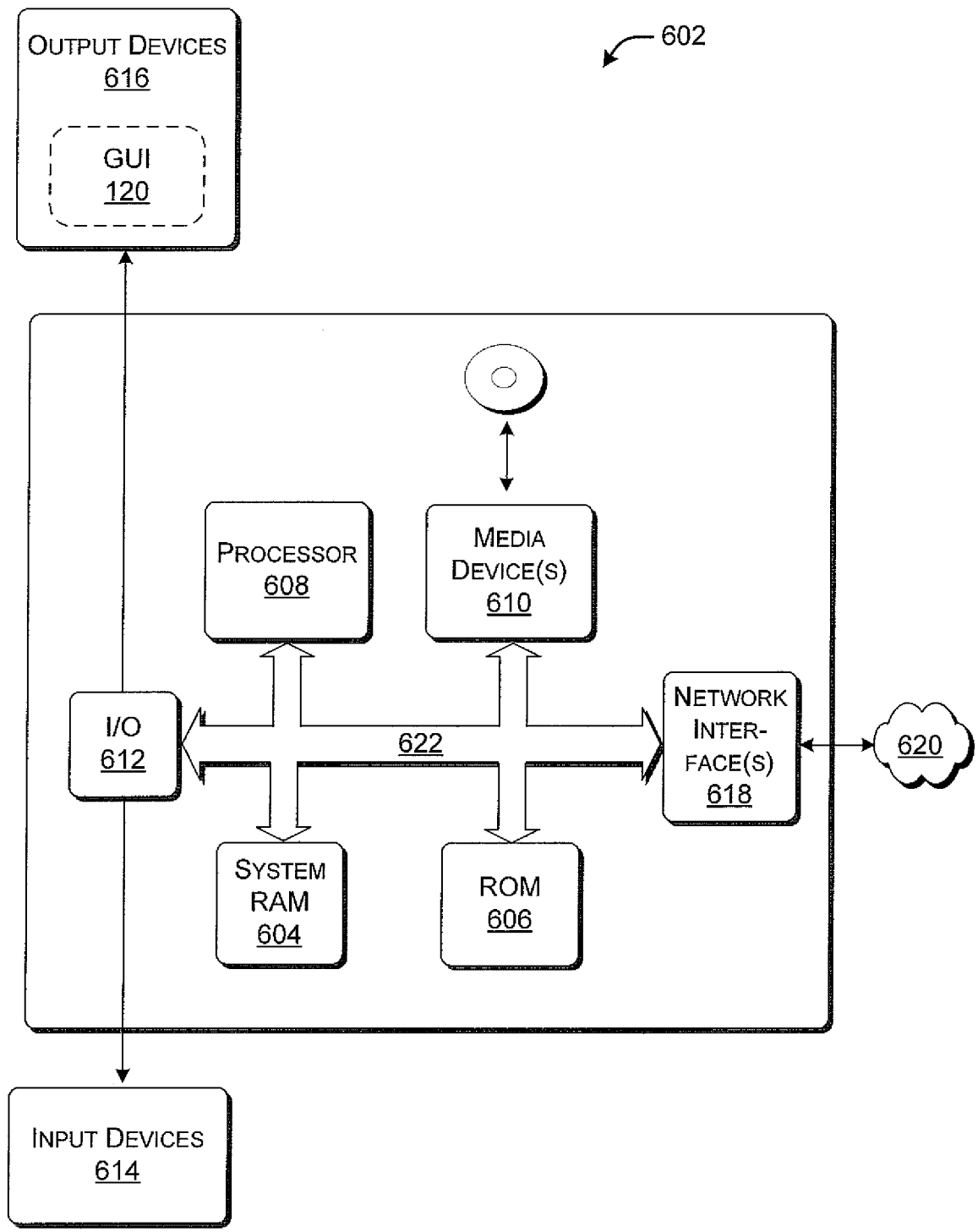
FIG. 6 shows exemplary processing functionality that can be used to implement any aspect of the system of FIG. 1.

FIG. 6 sets forth exemplary processing functionality 602 that can be used to implement any aspect of system 100 shown in FIG. 1. In one non-limiting case, for instance, the processing functionality 602 may represent any computer machine used by the system 100, e.g. to implement any aspect of the user device 102, any aspect of the sever-side security module 130, any aspect of any network-accessible entity, and so on.

The processing functionality 602 can include various volatile and non-volatile memory, such as RAM 604 and ROM 606, as well as one or more central processing units (CPUs) 608. The processing functionality 602 can perform various operations identified above when the CPU 608 executes instructions that are maintained by memory (e.g., 604, 306, or elsewhere). The processing functionality 602 also optionally includes various media devices 610, such as a hard disk module, an optical disk module, and so forth.

The processing functionality 602 also includes an input/output module 612 for receiving various inputs from the user (via input devices 614), and for providing various outputs to the user (via output devices 616). One particular output device may include the presentation module 118 and an associated graphical user interface (GUI) 120 introduced in the context of FIG. 1. The processing functionality 602 can also include one or more network interfaces 618 for exchanging data with other devices via one or more communication conduits 620, such as the network 114 introduced in the context of FIG. 1. One or more communication buses 622 communicatively couple the above-described components together.

B. Exemplary Procedures

Figure 7:
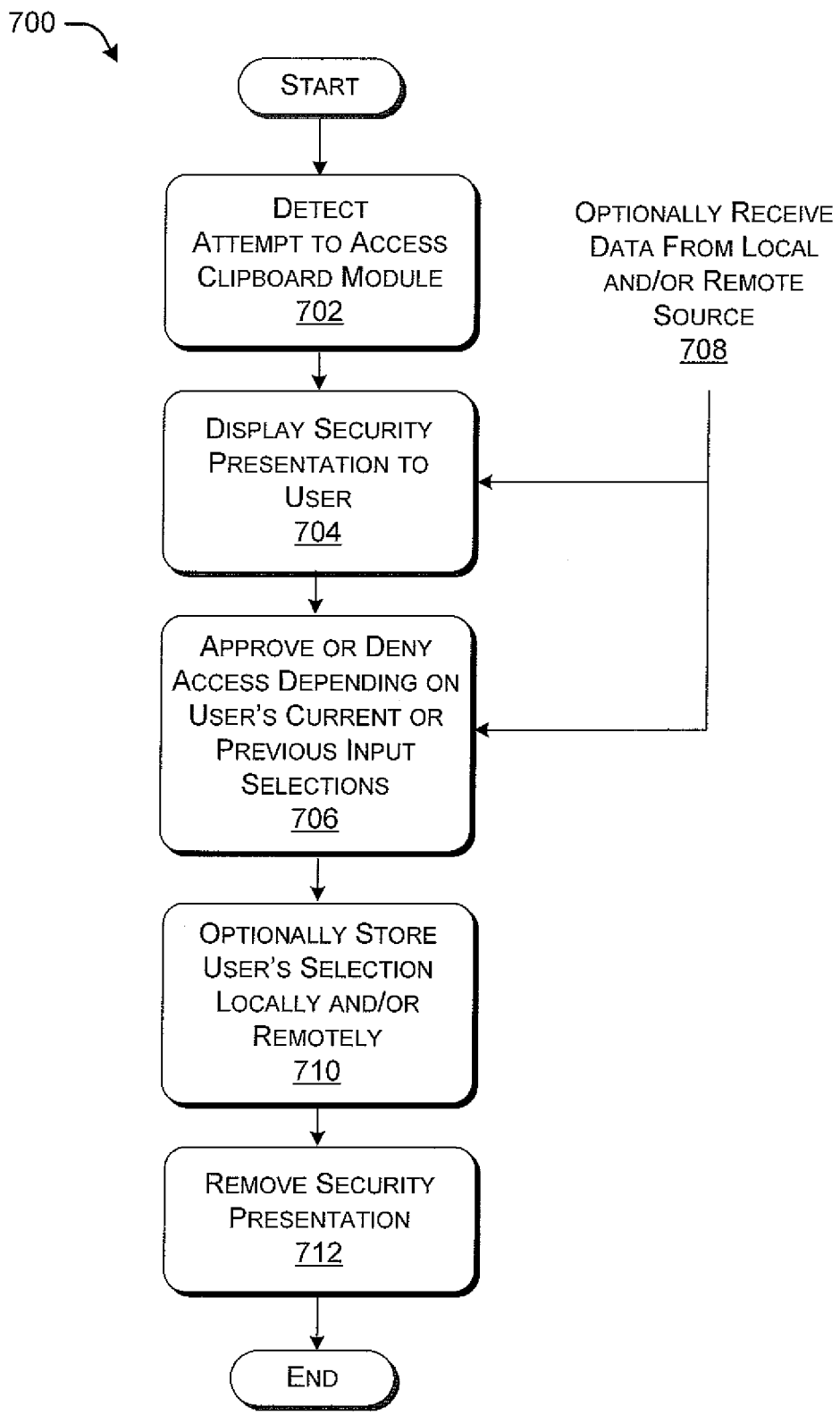
FIG. 7 shows an exemplary procedure which explains one manner of operation of the system of FIG. 1.

FIG. 7 shows a procedure 700 which explains the operation of the system 100 in flow chart form. To facilitate discussion, certain operations are described as constituting distinct blocks performed in a certain order. Such implementations are exemplary and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

As the functions described in the flowchart have already been set forth in Section A, Section B serves principally as a review of those functions.

In operation 702, the clipboard security module 124 detects an attempt to access the clipboard module 122, e.g., either to read information from the clipboard module 122, write information to the clipboard module 122, and/or perform any other action that affects the clipboard module 122. The clipboard security module 124 performs this detection for the main purpose of flagging security threats posed by untrusted entities. In one alternative case, an application designer may monitor accesses being made to the clipboard module 122 to ensure that his or her design is operating properly.

In operation 704, the clipboard security module 124 can display the security presentation 126 in response to the detected access. The security presentation 126 can include one or more of the fields described above.

In operation 706, the clipboard security module 124 either approves or denies the attempted access. This operation 706 may rely on the express selections made by the user to approve or deny the particular access attempt in question, e.g., in response to the user activating an "Approve" or "Deny" type of command prompt. Or this operation 706 may rely on a previous instruction from the user to always approve or always deny access to the entity that is making the current access attempt.

Operation 708 indicates that operations 704 and 706 can alternatively, or in addition, rely on data obtained from a remote source, such as the server-side security module 130. For instance, as to operation 704, the clipboard security module 124 can rely at least in part on data obtained from the server-side security module 130 to present security warnings to the user. As to operation 706, the clipboard security module 124 can rely at least in part on "Approve Always" and "Deny Always" lists stored in the server-side security module 130.

In operation 710, the clipboard security module 124 can update an "Approve Always" list and/or a "Deny Always" list if the user makes such a selection in operation 706. These lists can be maintained locally (at the user device 102) or remotely (at the sever-side security module 130).

In operation 712, the clipboard security module 124 can remove the security presentation 126 after the user makes an express selection, and/or after a predetermined period of time has elapsed (regardless of whether the user makes a selection), and/or in response to some other factor or factors.

In closing, a number of features were described herein by first identifying exemplary problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method, comprising:
using one or more devices of an access control system to control access to a resource that is shared between a trusted environment and an untrusted environment by at least:
detecting an attempt to access the resource by a website that is assigned to a tab of a tabbed browser, the resource comprising a clipboard module for storing information that includes multiple entries, the clipboard module being configured to be shared among multiple tabbed entities that are each assigned to a different tab in the tabbed browser;
responsive to the detecting, restricting user interaction with the website by freezing user interaction with the tab assigned to the website while allowing user interaction with at least one other tab assigned to a different tabbed entity;
determining that one or more of the multiple entries that are a target of the attempt include information that is sensitive to a user;
responsive to the determining, providing a security presentation based on the detecting, the security presentation conveying at least:
an indication of the website which is making the attempt to access the resource;
an indication of the one or more of the multiple entries that are the target of the attempt; and
an invitation to the user to respond to the attempt;
receiving an input from the user in response to the invitation, the input comprising user selection of at least one individual entry from the one or more multiple entries from the clipboard to assign an action to be performed with respect to the at least one individual said entry; and
performing the action based on the received input.

2. The method of claim 1, wherein the trusted environment is associated with a client device and the untrusted environment is associated with the website.

3. The method of claim 2, wherein the resource is a memory module for storing information, wherein the clipboard module is accessible to both the client device and the website.

4. The method of claim 3, wherein the indication of the website making the attempt comprises an identifier associated with the website.

5. The method of claim 3, wherein the indication of the information that is the target of the attempt comprises an identification of information that the website is attempting to read from the clipboard module or add to the clipboard module.

6. The method of claim 3, wherein the invitation to the user comprises an invitation to approve or deny the website's attempt to access the clipboard module.

7. The method of claim 6, wherein the invitation to the user comprises an invitation to approve or deny all attempts to access the clipboard module by the website.

8. The method of claim 3, wherein the invitation to the user comprises an invitation to clear at least part of information stored in the clipboard module.

9. The method of claim 1, wherein the security presentation also conveys a security warning associated with the attempt to access the resource.

10. The method of claim 1, wherein the providing further comprises receiving data from a remote data store and using the received data, at least in part, to generate the security presentation.

11. The method of claim 1, further comprising:
receiving main content; and
displaying the main content to a user in a first user interface presentation,
wherein the providing of the security presentation comprises displaying the security presentation in a second user interface presentation,
wherein the security presentation in the second user interface presentation does not block the user's interaction with the main content displayed in the first user interface presentation.

12. One or more machine-readable storage media devices containing machine-readable instructions thereon which, when executed, implement the method of claim 1.

13. One or more computing devices, comprising:
one or more processors; and
memory to store computer-executable instructions that, when executed by the one or more processors, perform the method of claim 1.

14. A method, comprising:
using one or more computing devices to control access to a clipboard module by at least:
receiving main content;
displaying the main content in a first user interface presentation;
detecting an attempt by a website to read from or write to the clipboard module, the clipboard module being configured to be shared among multiple tabbed entities that are each assigned to a different tab in the first user interface presentation;
responsive to the detecting, restricting user interaction with the website by freezing user interaction with a tab assigned to the website while allowing user interaction with at least one other tab assigned to a different tabbed entity in the first user interface presentation;
displaying a security presentation in a second user interface presentation in response to the detecting, the security presentation providing an invitation to approve or deny the attempt and information describing a history of past access attempts by the website, the information including identifying attributes associated with each of the past access attempts,
wherein the security presentation in the second user interface presentation does not block a user's interaction with the main content displayed in the first user interface presentation; and
removing the second user interface presentation and the security presentation after a predetermined time regardless of whether user input is received in response to the invitation.

15. One or more machine-readable storage media devices containing machine-readable instructions thereon which, when executed, implement the method of claim 14.

16. One or more computing devices, comprising:
one or more processors; and
memory to store computer-executable instructions that, when executed by the one or more processors, perform the method of claim 14.

17. A computing system comprising processing hardware configured to implement a security module, the security module comprising:
a detection module for detecting an attempt by a network-accessible entity to read from or write to a clipboard module, wherein the clipboard module is configured to be shared among multiple tabbed entities in a tabbed browser and the network-accessible entity comprises a website associated with one of the multiple tabbed entities, each of the multiple tabbed entities being assigned to a different tab in the tabbed browser;
a display module for providing a security presentation in response to the detecting performed by the detection module, the security presentation conveying at least:
an indication of the network-accessible entity which is making the attempt;
an indication of information that is a target of the attempt; and
an invitation to a user to respond to the attempt;
a user input processing module for receiving an input from the user in response to the invitation; and
a blocking module operative to approve or deny the request based on the user's input with respect to a current or prior attempt by the network-accessible entity to access the clipboard module;
the security module being configured to restrict user interaction with the one of the multiple tabbed entities in response to the attempt by freezing user interaction with a tab assigned to the one of the multiple tabbed entities while allowing user interaction with at least one other tab assigned to a different tabbed entity.

18. The computing system of claim 17, wherein the security presentation is configured so as not to block a user's interaction with another presentation being contemporaneously provided to the user.

* * * * *